United States Patent
Burgess et al.

(10) Patent No.: US 8,489,456 B2
(45) Date of Patent: *Jul. 16, 2013

(54) CONSUMER OFFER REDEMPTION METHODS AND SYSTEMS

(75) Inventors: Thomas Burgess, Portsmouth, RI (US); Francis Correra, Andover, MA (US); Douglas M. Spear, Jr., Newport, RI (US)

(73) Assignee: Linkable Networks, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,860

(22) Filed: May 30, 2012

(65) Prior Publication Data

US 2012/0239475 A1 Sep. 20, 2012

Related U.S. Application Data

(63) Continuation of application No. 13/197,279, filed on Aug. 3, 2011.

(60) Provisional application No. 61/370,559, filed on Aug. 4, 2010.

(51) Int. Cl.
*G06Q 30/00* (2012.01)
*G06Q 30/02* (2012.01)

(52) U.S. Cl.
USPC ............ 705/14.47; 705/14.1; 705/14.49; 705/14.51; 705/14.56

(58) Field of Classification Search
USPC ............ 705/14.1, 14.47, 14.49, 14.56, 14.51
See application file for complete search history.

(56) References Cited

U.S. PATENT DOCUMENTS

| | | | |
|---|---|---|---|
| 6,009,412 A | 12/1999 | Storey | |
| 6,298,330 B1 | 10/2001 | Gardenswartz et al. | |
| 6,847,935 B1 | 1/2005 | Solomon et al. | |
| 7,155,411 B1 | 12/2006 | Blinn et al. | |
| 7,783,532 B2 | 8/2010 | Hsu et al. | |
| 7,933,841 B2 | 4/2011 | Schmeyer et al. | |
| 8,239,295 B2 | 8/2012 | Hsu et al. | |
| 2005/0080672 A1* | 4/2005 | Courtion et al. | 705/14 |
| 2007/0061206 A1 | 3/2007 | LeFebvre | |
| 2008/0249813 A1 | 10/2008 | Schmeyer | |
| 2009/0276306 A1 | 11/2009 | Hicks | |
| 2010/0010887 A1 | 1/2010 | Karlin et al. | |
| 2011/0029368 A1 | 2/2011 | Hsu et al. | |
| 2011/0225033 A1 | 9/2011 | Schmeyer et al. | |
| 2011/0251884 A1 | 10/2011 | Hsu et al. | |
| 2012/0124608 A1* | 5/2012 | Postrel | 725/23 |
| 2012/0209684 A1* | 8/2012 | Postrel | 705/14.23 |

OTHER PUBLICATIONS

International Search Report and Written Opinion for PCT/US2011/046409, dated Feb. 29, 2012.

* cited by examiner

*Primary Examiner* — Raquel Alvarez

(57) ABSTRACT

A computer-implemented offer redemption method includes the steps of: (a) storing information on a consumer and a payment account associated with the consumer in a computer storage system; (b) receiving activation of an offer from the consumer covering a product or service or a purchase from a retailer; (c) linking the offer to the consumer's payment account; (d) monitoring transactions in the consumer's payment account; and (e) when the consumer has purchased the product or service or made a purchase from the retailer covered by the linked offer using the consumer payment account, making payment for offer settlement to a payment processor managing the consumer's payment account to be credited to the consumer's payment account.

23 Claims, 2 Drawing Sheets

CONSUMER OFFER REDEMPTION METHODS AND SYSTEMS

CROSS REFERENCE TO RELATED APPLICATIONS

This application is a continuation of U.S. patent application Ser. No. 13/197,279 filed on Aug. 3, 2011 entitled CONSUMER OFFER REDEMPTION METHODS AND SYSTEMS, which application claims priority from U.S. Provisional Patent Application No. 61/370,559 filed on Aug. 4, 2010 entitled CONSUMER OFFER REDEMPTION SYSTEM, both of which are hereby incorporated by reference.

BACKGROUND

The present application is generally directed to a method and system for presenting offers to consumers and processing offer redemptions. The system links offers from businesses directly to existing payment accounts of consumers, thereby eliminating the need for mail-in rebates or point-of-sale integration.

BRIEF SUMMARY OF THE DISCLOSURE

A computer-implemented offer redemption method in accordance with one or more embodiments includes the steps of: (a) storing information on a consumer and a payment account associated with the consumer in a computer storage system; (b) receiving activation of an offer from the consumer covering a product or service or a purchase from a retailer; (c) linking the offer to the consumer's payment account; (d) monitoring transactions in the consumer's payment account; and (e) when the consumer has purchased the product or service or made a purchase from the retailer covered by the linked offer using the consumer payment account, making payment for offer settlement to a payment processor managing the consumer's payment account to be credited to the consumer's payment account.

A computer-implemented offer redemption method in accordance with one or more further embodiments includes the steps of: (a) storing information on a consumer and a payment account associated with the consumer in a computer storage system; (b) receiving activation of an offer from the consumer covering a product or service available from a retailer; (c) linking the offer to the consumer's payment account; (d) monitoring transactions in the consumer's payment account; and (e) determining whether a transaction in the consumer's payment account is potentially covered by the linked offer by filtering out ineligible transactions that do not meet offer criteria; (f) when the transaction is determined to be potentially covered by the offer, transmitting a verification request to an offer issuer or third party data provider to verify that the transaction is covered by the offer by matching a unique identifier of a product or service purchased in the transaction with a unique identifier specified in the offer; (g) when the transaction is verified by the offer issuer to be covered by the offer, making payment for offer settlement to a payment processor to be credited to the consumer's payment account.

A computerized offer redemption system in accordance with one or more embodiments comprises at least one processor, memory associated with the at least one processor, and a program supported in the memory for processing offers provided to consumers. The program includes a plurality of instructions stored therein which, when executed by the at least one processor, cause the at least one processor to: (a) store information on a consumer and a payment account associated with the consumer in a memory; (b) receive activation of an offer from the consumer covering a product or service or a purchase from a retailer; (c) link the offer to the consumer's payment account; (d) monitor transactions in the consumer's payment account; and (e) when the consumer has purchased the product or service or made a purchase from the retailer covered by the linked offer using the consumer payment account, make payment for offer settlement to a payment processor managing the consumer's payment account to be credited to the consumer's payment account.

A computerized offer redemption system in accordance with one or more further embodiments comprises at least one processor, memory associated with the at least one processor, and a program supported in the memory for processing offers provided to consumers. The program includes a plurality of instructions stored therein which, when executed by the at least one processor, cause the at least one processor to: (a) store information on a consumer and a payment account associated with the consumer in a memory; (b) receive activation of an offer from the consumer covering a product or service available from a retailer; (c) link the offer to the consumer's payment account; (d) monitor transactions in the consumer's payment account; and (e) determine whether a transaction in the consumer's payment account is potentially covered by the linked offer by filtering out ineligible transactions that do not meet offer criteria; (f) when the transaction is determined to be potentially covered by the offer, transmit a verification request to an offer issuer or third party data provider to verify that the transaction is covered by the offer by matching a unique identifier of a product or service purchased in the transaction with a unique identifier specified in the offer; (g) when the transaction is verified by the offer issuer to be covered by the offer, make payment for offer settlement to a payment processor to be credited to the consumer's payment account.

DETAILED DESCRIPTION

A variety of different types of consumer payment accounts can be used in the methods and systems described herein. In various examples described below, the payment accounts of the consumers are indicated as being credit/debit card accounts. This is by way of example only, and it should be understood that a variety of other types of consumer payment accounts can also be utilized including, e.g., an online money transfer account such as a PayPal™ or eWise™ account, a mobile payment account, a virtual money account, or a rewards or points account. Also, although the examples described herein refer to banks as the entities managing consumer payment accounts, it should be understood that a variety of other types of payment processing entities can be used including, e.g., a credit or debit card issuer, an online money transfer service, a mobile payment service, an alternative currency issuer, a points or rewards processing system, or a third-party settlement provider.

In addition, instead of using a debit/credit card having account information presented in a magnetic stripe at the back of the card, payment and account details can be presented to retailers through a variety of other media, methods, and devices including, but not limited to, smartphones, retinal/finger scans, and RFID tags.

As used herein, the term "credit/debit card" includes any payment card including credit cards, debit cards, charge cards, and prepaid cards. Credit and debit cards can be either open loop or closed loop cards.

As used herein, the term "offer" refers to an incentive presented to a consumer. Such incentives can include rebates for purchasing a particular product or service (or a collection of products or services) or for making a purchase from a particular retailer (or group of retailers). Offers can include restrictions such as, e.g., retailer constraints, product or SKU-level constraints, date constraints, and purchase amount constraints.

Figure 1:
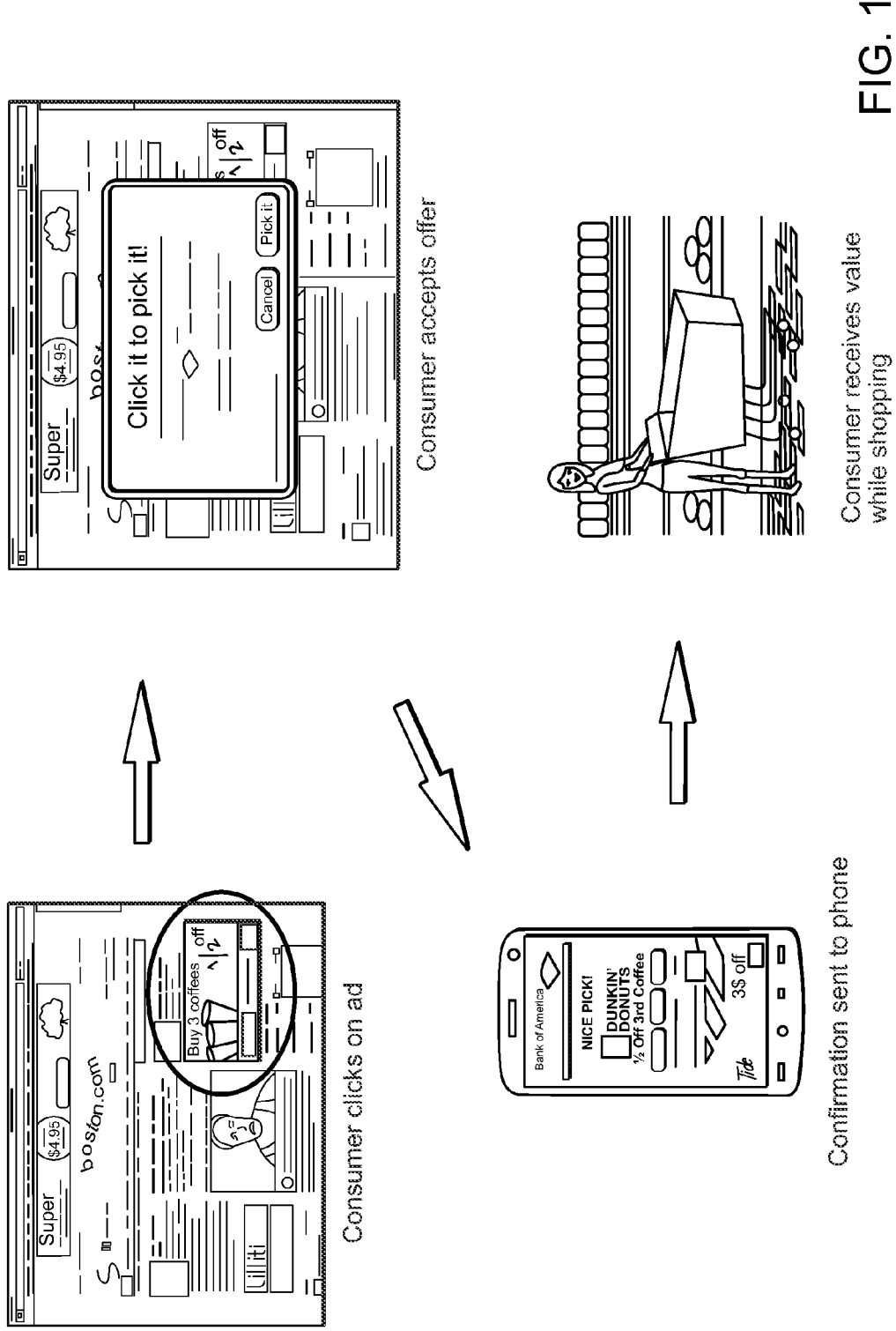
FIG. 1 illustrates an exemplary consumer offer redemption process in accordance with one or more embodiments.

FIG. 1 illustrates one example of how a consumer can use an advertised offer to obtain a rebate for purchasing a product or service. Consumers initially register one or more credit or debit cards with the offer processing system. Once a card is registered, a consumer can easily link offers to the card by, e.g., clicking on an offer, scanning an offer, or texting a response to an offer. The offer processing system can enable virtually any type of advertising media for presenting offers including, but not limited to, mobile, online, and off-line advertising. In the FIG. 1 example, the consumer is presented with an offer in the form of an advertisement displayed on a webpage. The consumer clicks on the advertisement in order to link (i.e., accept and activate) the offer. The offer processing system receives the consumer's acceptance of the offer, identifies the consumer (from prior consumer registration), associates the offer to the consumer's registered credit/debit card, and sends a notification (e.g., an email or text message) to the consumer confirming the linked offer and optionally providing any terms and conditions of the offer. Following a qualified purchase by the consumer (i.e., use of the linked card to make a purchase in accordance with the offer terms and conditions), the rebate or savings offered are automatically settled back to the consumer's card account, as will be described in further detail below in connection with FIG. 2.

In one or more embodiments, the offer processing system can be used to create campaigns for offering consumer rebates across display and mobile advertising networks. Consumers can accept offers by clicking on display or mobile network advertised rebate offers.

Campaigns offering consumer rebates can also be created across radio, television, print, and digital out of the home networks (DOOH). Consumers can link these offers to their payment accounts in various ways including, e.g., by using a cell phone to text a response to the offers.

Consumers can also use a Smartphone application to bar code scan, quick response (QR) code scan, tag code scan, or **code a mobile response to display, mobile, print, or DOOH advertised rebate offers and link such offers to their credit/debit cards.

After a consumer accepts an offer, the offer processing system links the offer to the consumer's credit/debit card.

Figure 2:
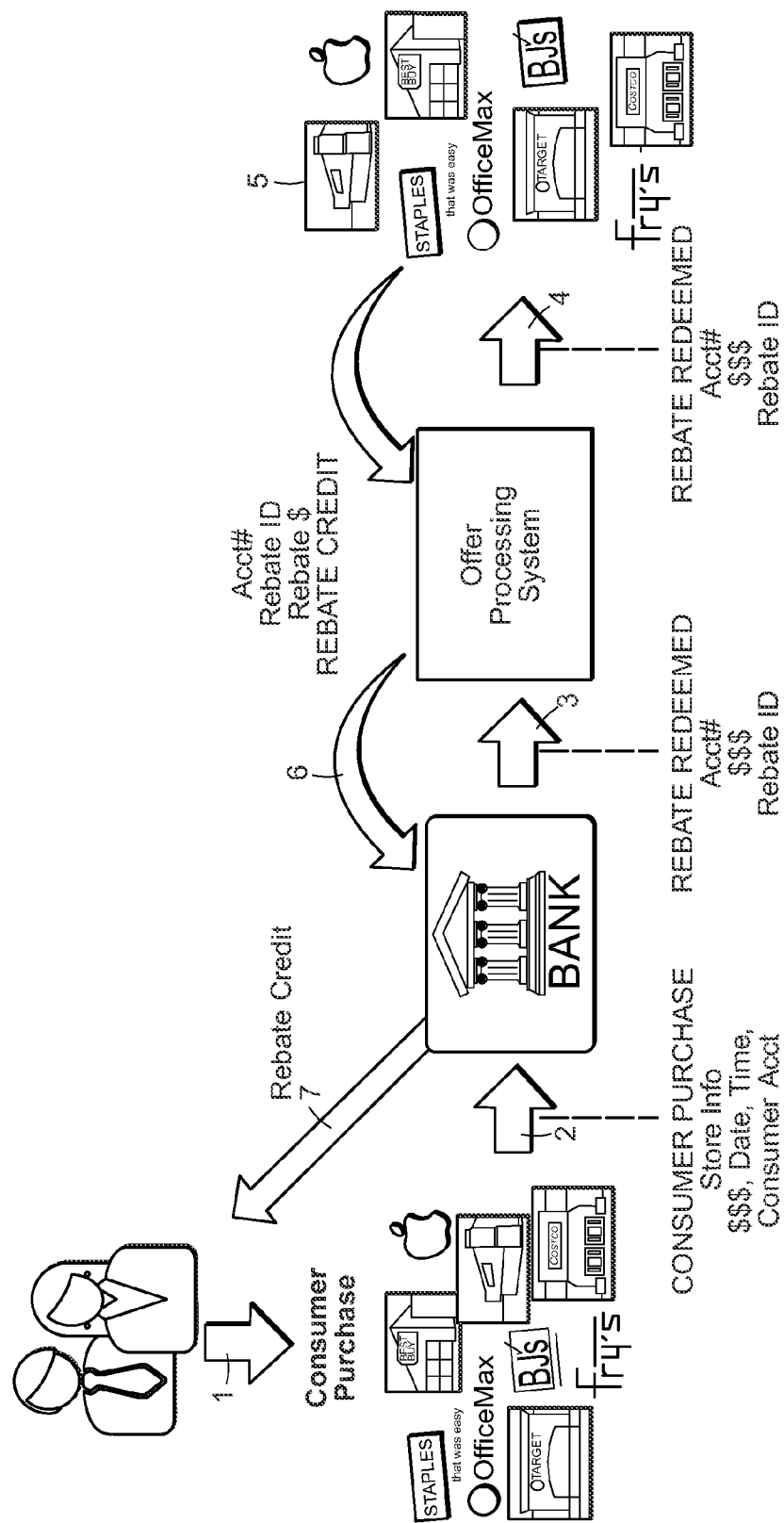
FIG. 2 illustrates an exemplary offer redemption process flow in accordance with one or more embodiments.

FIG. 2 illustrates an exemplary cardholder retention pathway in accordance with one or more embodiments.

Step 1: A consumer purchases a particular product or service associated with a previously linked rebate offer at a retail store (or makes a purchase at a particular retail store associated with a linked rebate offer) using a registered credit/debit card.

Step 2: The retailer transmits debit details relating to the purchase to the credit/debit card issuing bank for transaction clearing purposes. The debit details can include the retail store information, the amount of the purchase, the date and time of the transaction, and the consumer account number, among other data.

Step 3: The offer processing system (labeled in FIG. 2 as "Offer Processing System") monitors active consumer payment transactions via direct access to the bank (or other payment vehicle source, e.g., mobile wallet) or through a third party data provider to match consumer purchase data (from the debit details) to linked offers.

Step 4: The offer processing system communicates matched rebate/purchase details to the offer issuing entity, which can be, e.g., the retail store, product manufacturer, or distributor.

Step 5: The offer issuing entity verifies that the purchase qualifies for a rebate. In particular, the offer issuing entity verifies that particular products or services covered by the offer were purchased by the customer in the customer transaction.

Step 6: Upon validation of the purchase as a qualified purchase, the offer processing system issues settlement instructions to the card issuing bank. In one or more embodiments, the settlement instructions include an authorization for the bank to withdraw funds from a given account for rebate settlement.

Step 7: The cardholder's issuing bank associates the settlement instructions with the customer's credit/debit card information and makes payment to the customer's credit/debit card.

In the exemplary process described above, Steps 4-5 apply particularly to offers covering the purchase of a particular product or service. For offers relating to purchases from a particular retailer, no offer validation by the offer issuing entity is required since the offer processing system will know from Step 3 whether the requirements of the offer have been met. For example, the offer processing system will know whether the consumer has purchased a minimum qualifying amount at a particular retailer or group of retailers specified in the offer In this way, consumers can accept offers, make purchases of products or services, and automatically receive rebates without the inconvenience of using a mail-in rebate.

SKU (Stock-Keeping Unit) Level Tracking

In accordance with one or more further embodiments, methods and systems are provided for an offer redemption system that can provide SKU level tracking. An exemplary SKU level tracking process is described below.

Step 1: A rebate offer campaign for a particular product is initiated, e.g., by an advertising agency, a brand, a retailer, or a manufacturer.

Step 2: As part of the campaign set-up, the following offer information (among other information) is loaded into the offer processing system and stored in a computer storage system:

Manufacturer Name (e.g., Panasonic™)
Retailer(s) Name (e.g., Best Buy™, Staples™)
UPC of advertised item (typically common to all retailers)
SKU of advertised item (typically specific to each retailer)
Price of advertised item Step 3: The offer processing system retains this information in a campaign database for a SKU level refund from the manufacturer when a consumer completes purchase of a product identified by the SKU. This information can assist with attribution tracking.

Step 4: The offer processing system distributes the campaign across the designated media to meet the targeting requirements of the advertiser.

Step 5: A consumer registered with the offer processing system links a SKU-level offer, e.g., by clicking on an enabled offer presented on a website. SKU-level offers are specific to individual products, e.g., 10% off a Panasonic™ 12.1 Megapixel Digital Camera (UPC xxx, retailer SKU xxx—by Jun. 15, 2012).

Step 6: The consumer makes a qualified purchase at a retailer. In this case that entails purchasing the specific product or making a purchase from a particular retailer identified in the offer and in accordance with any other offer terms and conditions.

Step 7: The retailer transmits debit details relating to the purchase to the credit/debit card issuing bank for transaction clearing purposes. The debit details can include the retail store information, the amount of the purchase, the date and time of the transaction, and the consumer account number, among other data. The information typically does not include SKU data.

Step 8: The offer processing system monitors active consumer payment transactions via direct access to the bank (or other payment vehicle source, e.g., mobile wallet) or through a third party data provider to match consumer purchase data (from the debit details) to a retailer or set of retailers designated in the campaign.

Step 9: When consumer transactions at a designated retailer are identified, the offer processing system performs a preliminary transaction-to-offer matching process to identify possible qualified transactions by eliminating transactions that do not meet the rebate criteria (e.g., the purchase amount is less than the SKU item price, a date constraint is not satisfied, or a retailer constraint is not satisfied).

Step 10: The offer processing system periodically provides a list of potentially qualifying transactions to the designated retailer(s) or third party SKU data provider, and requests that the retailer(s) or third party SKU data provider verify offer compliance. This request may be sent directly from the offer processing system to retailer or it may pass through a clearinghouse partner company or other third-party. For example, for any purchases that appear within the rebate criteria (e.g., a $299 purchase on May 31, 2010), a verification request is sent to the retailer (e.g., Best Buy). By way of example, the verification request can contain the following information:

Verification request identifier (e.g., request for verification that user X purchased a Panasonic™ 12.1 Megapixel Digital Camera- Black);
Purchase transaction identifier (e.g., consumer credit card number, transaction number)
Transaction store identifier
Transaction date/time stamp
Transaction amount
List of eligible SKU numbers (1 . . . n)
List of eligible Manufacturer UPC numbers (1 . . . n)
Purchase authorization identifier Step 11: The retailer (e.g., Best Buy) or third party SKU data provider determines whether the purchase meets the requirements of the offer. Specifically, the retailer(s) or third party SKU data provider uses the data provided by the offer processing system to search its transaction records for a unique transaction that best matches the transaction data provide by the system. When a match is made, the retailer(s) or third party SKU data provider reviews the basket or SKU data associated with the transaction to determine whether a qualified purchase has been made.

As part of the data review, the retailer(s) or third party SKU data provider may also elect to confirm that the transaction satisfies other offer conditions including but not limited to whether (i) a retailer level offer has been applied to excluded items (e.g., a gift card or cash back on a debit card), (ii) the consumer has returned the goods for a credit as part of a future transaction, thus eliminating the qualifying sale, (iii) the consumer has impermissibly stacked offers (e.g., presented a paper coupon for a 10% discount and attached a card linked offer for another 10% rebate).

Step 12: The retailer (e.g., Best Buy) or third party SKU data provider sends the offer processing system the results of the verification request. By way of example, the results can include:

A verification request identifier matching the identifier used in the verification request.
Result status, which can, e.g., be SUCCESS, FAILURE-RETRY (request could not be processed, try again later) or FAILURE STOP (request could not be processed, do not retry) or TRANSACTION-MULTIPLE-MATCH (multiple transactions matched the verification request data).
SKU Details (one for each SKU in the list of SKU specified in the verification request), the details can include SKU number, verification status (which can be SKU-PRESENT or SKU-NOT-PRESENT), Return status (which can be SKU-RETURNED or SKU-NOT-RETURNED), and discount status (which can be DISCOUNT-APPLIED or DISCOUNT-NOT-APPLIED).

Step 13: If the results of the verification request indicate a rejection of the transaction, no rebate is applied to the consumer's credit/debit card. If the results indicate an approval of the transaction, a rebate is applied to the consumer's credit/debit card.

Step 14: An advertiser may access the offer processing system for campaign performance data periodically (e.g., once a day). Campaign data can include a record of approved rebates and an invoice for the amount. The offer processing system can also be set to alert the advertiser of performance thresholds to help manage success of campaigns. The offer processing system can also provide a record of rejected transactions.

As discussed above, in the various examples described herein, the payment accounts of the consumers are indicated as being credit/debit card accounts. This is for the sake of simplicity only. It should be understood that a variety of different types of consumer payment accounts can be used in the methods and systems described herein including, e.g., an online money transfer account such as a PayPal™ or eWise™ account, a mobile payment account, a virtual money account, or a rewards or points account. Also, although the examples described herein refer to banks as the entities managing consumer payment accounts, it should be understood that a variety of other types of payment processing entities can be used including, e.g., a credit or debit card issuer, an online money transfer service, a mobile payment service, an alternative currency issuer, a points or rewards processing system, or a third-party settlement provider.

Furthermore, while examples discussed herein refer to use of SKU identifiers for products or services, it should be understood that other possible unique identifiers can also be used in accordance with various embodiments, including, e.g., a radio-frequency identification (RFID) code.

The offer processing system can comprise a server computer system, which performs the functions described above. The retail stores, third party SKU data providers, card issuing banks (or other payment processing entities), product manufacturers, and other users communicate with the offer processing system via a communications network. The network may be any network or combination of networks, including without limitation, the Internet, a local area network, a wide area network, a wireless network and a cellular network. As discussed above, consumers can accept offers using a client computing device, which may be a laptop, a desktop, a workstation, a cell phone, a Smartphone, a mobile device, a satellite phone, or any other computing apparatus.

The functions of the offer processing system and other processes described above may be implemented in software, hardware, firmware, or any combination thereof. The processes are preferably implemented in one or more computer programs executing on a programmable computer including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the offer processing system may comprise one or more physical machines, or virtual machines running on one or more physical machines. In addition, the offer processing system may comprise a cluster of computers or numerous distributed computers that are connected by the Internet or another network.

Accordingly, the foregoing description and attached drawings are by way of example only, and are not intended to be limiting.

What is claimed is:

1. A computer-implemented offer redemption method comprising:
   (a) storing information on a consumer and on a consumer's payment account associated with the consumer in a computer storage system;
   (b) receiving activation of an offer from the consumer covering a product or service available from a retailer prior to the consumer purchasing the product or service and storing it in the computer storage system;
   (c) linking the activated offer to the consumer's payment account after receiving activation of the offer from the consumer;
   (d) monitoring transactions made over a period of time in the consumer's payment account using the computer storage system;
   (e) using the computer storage system to determine whether a transaction in the consumer's payment account is potentially covered by the linked offer by filtering out ineligible transactions in the consumer's payment account that do not meet offer criteria;
   (f) when the transaction is determined to be potentially covered by the offer, transmitting a verification request to an offer issuer or third party data provider using the computer storage system to verify that the transaction is covered by the offer by matching a unique identifier of a product or service purchased in the transaction with a unique identifier specified in the offer;
   (g) when the transaction is verified by the offer issuer to be covered by the offer, making payment for offer settlement to a payment processor to be automatically credited to the consumer's payment account_using the computer storage system.

2. The method of claim 1, wherein the unique identifier comprises a stock-keeping unit (SKU) code or a radio-frequency identification (RFID) code.

3. The method of claim 1, wherein verifying that the transaction is covered by the offer comprises determining whether the product or service was purchased by a specified date or from a specified retailer.

4. The method of claim 1, wherein step (e) comprises determining whether the transaction has a price that equals or exceeds the price indicated by the unique identifier or determining whether the transaction was made by a date specified in the offer.

5. The method of claim 1, wherein the payment processor comprises a bank, a credit or debit card issuer, an online money transfer service, a mobile payment service, an alternative currency issuer, a points or rewards processing system, or a third-party settlement provider.

6. The method of claim 1, wherein the payment account comprises a credit card account, a debit card account, an online money transfer account, a mobile payment account, a virtual money account, or a rewards or points account.

7. The method of claim 1, wherein the offer comprises a rebate.

8. The method of claim 1, further comprising presenting offers to consumers through a mobile advertisement, an online display advertisement, an out of home, digital out of home, an email, direct mail, a radio advertisement, a television advertisement, a print advertisement, or an advertisement presented in a kiosk.

9. The method of claim 8, wherein the consumer can activate the offer by clicking-on the advertisement, texting a response to an advertisement, scanning a quick response (QR) code, a tag code, or a barcode in an advertisement, or using a **code.

10. The method of claim 1, wherein each of the steps of the method are performed by a server computer system communicating over a communications network with client devices operated by consumers, payment processors, third party data providers, or offer issuers.

11. The method of claim 1, wherein making payment for offer settlement to a payment processor comprises transferring funds to the payment processor or authorizing the payment processor to withdraw funds from a specified account.

12. A computerized offer redemption system, comprising:
   at least one processor;
   memory associated with the at least one processor; and
   a program supported in the memory for processing offers provided to consumers, the program having a plurality of instructions stored thereon which, when executed by the at least one processor, cause the at least one processor to:
   (a) store information on a consumer and on a consumer's payment account associated with the consumer in a memory;

(b) receive activation of an offer from the consumer covering a product or service available from a retailer prior to the consumer purchasing the product or service;

(c) link the activated offer to the consumer's payment account, after receiving activation of the offer from the consumer;

(d) monitor transactions made over a period of time in the consumer's payment account; and (e) determine whether a transaction in the consumer's payment account is potentially covered by the linked offer by filtering out ineligible transactions in the consumer's payment account that do not meet offer criteria;

(f) when the transaction is determined to be potentially covered by the linked offer, transmit a verification request to an offer issuer or third party data provider to verify that the transaction is covered by the offer by matching a unique identifier of a product or service purchased in the transaction with a unique identifier specified in the offer;

(g) when the transaction is verified by the offer issuer to be covered by the offer, automatically making a payment for offer settlement to a payment processor to be credited to the consumer's payment account.

13. The system of claim 12, wherein the unique identifier comprises a stock-keeping unit (SKU) code or a radio-frequency identification (RFID) code.

14. The system of claim 12, wherein to verify that the transaction is covered by the offer comprises to determine whether the product or service was purchased by a specified date or from a specified retailer.

15. The system of claim 12, wherein (e) comprises determine whether the transaction has a price that equals or exceeds the price indicated by the unique identifier or determine whether the transaction was made by a date specified in the offer.

16. The system of claim 12, wherein the payment processor comprises a bank, a credit or debit card issuer, an online money transfer service, a mobile payment service, an alternative currency issuer, a points or rewards processing system, or a third-party settlement provider.

17. The system of claim 12, wherein the payment account comprises a credit card account, a debit card account, an online money transfer account, a mobile payment account, a virtual money account, or a rewards or points account.

18. The system of claim 12, wherein the offer comprises a rebate.

19. The system of claim 12, wherein the program further comprises instructions for presenting offers to consumers through a mobile advertisement, an online display advertisement, an out of home, digital out of home, an email, direct mail, a radio advertisement, a television advertisement, a print advertisement, or an advertisement presented in a kiosk.

20. The system of claim 19, wherein the consumer can activate the offer by clicking-on the advertisement, texting a response to an advertisement, scanning a quick response (QR) code, a tag code, or a barcode in an advertisement, or using a **code.

21. The system of claim 12, wherein the computerized offer redemption system communicates over a communications network with client devices operated by consumers, payment processors, third party data providers, or offer issuers.

22. The system of claim 12, wherein to make payment for offer settlement to a payment processor comprises to transfer funds to the payment processor or authorize the payment processor to withdraw funds from a specified account.

23. A computer-implemented offer redemption method comprising:

(a) storing information on a consumer and on a consumer's payment account associated with the consumer in a computer storage system;

(b) receiving activation of an offer from the consumer prior to purchase and storing it in the computer storage system;

(c) linking the activated offer to the consumer's payment account after receiving activation of the offer from the consumer;

(d) monitoring transactions made over a period of time in the consumer's payment account using the computer storage system;

(e) using the computer storage system to filter out ineligible transactions in the consumer's payment account that do not meet the offer criteria;

(f) transmitting a verification request using the computer storage system for any transactions remaining in the consumer's payment account that are potentially covered by the linked offer;

(g) matching a unique identifier of a product or service purchased in the transaction with a unique identifier specified in the offer to verify that the remaining transaction in the consumer's payment account meets the linked offer criteria;

(h) making payment for offer settlement to a payment processor to be credited automatically to the consumer's payment account using the computer storage system.

* * * * *